United States Patent
Aronson

(10) Patent No.: US 9,635,025 B2
(45) Date of Patent: Apr. 25, 2017

(54) SCALABLE FULL SPECTRUM CYBER DETERMINING MACHINE

(71) Applicant: Jeffry David Aronson, San Antonio, TX (US)

(72) Inventor: Jeffry David Aronson, San Antonio, TX (US)

(*) Notice: Subject to any disclaimer, the term of this patent is extended or adjusted under 35 U.S.C. 154(b) by 0 days.

(21) Appl. No.: 15/071,075

(22) Filed: Mar. 15, 2016

(65) Prior Publication Data

US 2016/0197920 A1    Jul. 7, 2016

Related U.S. Application Data

(63) Continuation-in-part of application No. 14/857,445, filed on Sep. 17, 2015, now Pat. No. 9,319,414, which
(Continued)

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06F 21/40* (2013.01);
(Continued)

(58) Field of Classification Search
CPC ..... H04L 63/0861; H04L 63/10; G06Q 10/06; G06F 21/32; G06F 21/40
See application file for complete search history.

(56) References Cited

U.S. PATENT DOCUMENTS

| | | | | |
|---|---|---|---|---|
| 6,208,247 B1* | 3/2001 | Agre | ...... | G01V 1/223 340/13.25 |
| 2007/0288208 A1* | 12/2007 | Grigsby | ...... | G06Q 10/06 703/2 |

(Continued)

OTHER PUBLICATIONS

Linda et al., Towards Resilient Critical Infrastructures: Application of Type-2 Fuzzy Logic in Embedded Network Security Cyber Sensor, Sep. 2011, 4th International Symposium on Resilient Control Systems, pp. 26-32.*

*Primary Examiner* — Kenneth Chang
(74) *Attorney, Agent, or Firm* — John A. Fortkort; Fortkort & Houston PC

(57) ABSTRACT

A scalable universal full spectrum cyber determining machine for accurately and reliably determining and reporting any cyber determination from a full spectrum of possible cyber determinations. Utilizing cyber resources and predetermined criteria for providing cyber determinations regarding at least one subject of at least one observation, the cyber determining machine: provides cyber determinations for any possible subject of an observation; provides for the utilization of any selected attainable level of accuracy, up to and including 100% accuracy; provides for single, intermittently performed, and constantly performed cyber determinations; utilizes available cyber resources; interacts with itself and utilized cyber resources to perform possible functions; recognizes characteristics from observations and then utilizes recognized characteristics for comparing or determining; provides and utilizes standard designations for representing aspects of itself and its operations; utilizes useful information or outcomes from comparing for making determinations; and, reports on any aspect of its operations at any time.

23 Claims, 3 Drawing Sheets

Related U.S. Application Data is a continuation-in-part of application No. 14/316,196, filed on Jun. 26, 2014, now Pat. No. 9,166,981, which is a continuation of application No. 13/784,277, filed on Mar. 4, 2013, now Pat. No. 8,769,649, which is a continuation of application No. 13/688,925, filed on Nov. 29, 2012, now Pat. No. 8,434,136.

(51) Int. Cl.
    *G06F 21/40*     (2013.01)
    *G06Q 10/06*     (2012.01)
    *G10L 17/00*     (2013.01)

(52) U.S. Cl.
    CPC ............ *G06Q 10/06* (2013.01); *H04L 63/10* (2013.01); *G10L 17/00* (2013.01); *H04L 2463/082* (2013.01)

(56) References Cited

U.S. PATENT DOCUMENTS

| | | | | |
|---|---|---|---|---|
| 2009/0072965 | A1* | 3/2009 | Staab | G06Q 10/06 340/539.11 |
| 2009/0074184 | A1* | 3/2009 | Baum | G06F 17/30017 380/205 |
| 2009/0254971 | A1* | 10/2009 | Herz | G06Q 10/10 726/1 |
| 2012/0096549 | A1* | 4/2012 | Amini | H04L 63/1433 726/23 |

\* cited by examiner

SCALABLE FULL SPECTRUM CYBER DETERMINING MACHINE

CROSS-REFERENCE TO RELATED APPLICATIONS

This application is a continuation-in-part application of U.S. patent application Ser. No. 14/857,445, filed Sep. 17, 2015, entitled SCALABLE FULL SPECTRUM CYBER DETERMINATION PROCESS, having the same inventor, now allowed, which is incorporated herein by reference in its entirety; which application is a continuation-in-part application of U.S. patent application Ser. No. 14/316,196, filed Jun. 26, 2014, issued as U.S. Pat. No. 9,166,981 on Oct. 20, 2015, entitled FULL SPECTRUM CYBER IDENTIFICATION DETERMINATION PROCESS, having the same inventor, which is incorporated herein by reference in its entirety; which application is a continuation of U.S. patent application Ser. No. 13/784,277, filed Mar. 4, 2013, issued as U.S. Pat. No. 8,769,649 on Jul. 1, 2014, entitled FULL SPECTRUM CYBER IDENTIFICATION DETERMINATION PROCESS, having the same inventor, which is incorporated herein by reference in its entirety; which application is a continuation of U.S. patent application Ser. No. 13/688,925, filed Nov. 29, 2012, issued as U.S. Pat. No. 8,434,136 on Apr. 30, 2013, entitled FULL SPECTRUM CYBER IDENTIFICATION DETERMINATION PROCESS, having the same inventor, which is incorporated herein by reference in its entirety.

FIELD OF THE DISCLOSURE

The present disclosure relates generally to a scalable universal full spectrum cyber determining machine, and more particularly to a scalable universal full spectrum cyber determining machine that utilizes predetermined criteria, cyber resources, and observations or information for providing cyber determinations from the full spectrum of cyber determinations.

BACKGROUND OF THE DISCLOSURE

Cybersecurity is the protection of cyber resources from theft or damage thereto, including the hardware, the software and the information stored in the hardware or software. Cybersecurity typically entails controlling access to cyber resources and preventing disruption or misdirection of the services or information those cyber resources provide.

Cybersecurity has become increasingly important as the world has become increasingly reliant on cyber resources. Moreover, with the advent of the Internet of Things, networks have become increasingly complex. Hence, in addition to various types of personal computers and smart phones, networks have come to include almost any device which can be embedded with electronics, programming, sensors and network connectivity. The increasing importance of cyber systems has made cybersecurity more critical, while the increasing complexity of cyber systems has made cybersecurity increasingly challenging. Together, these factors have made existing cybersecurity measures increasingly inadequate.

At the heart of most cybersecurity failures is the complete inability of computers and cyber resources to accurately authenticate the identity of a person prior to allowing that person to gain access to cyber resources. Utilizing a cyber determining machine for providing cyber determinations that accurately authenticate a person's identity is an indispensable part of putting an end to the cybersecurity failures that now plague cyberspace. Accurately authenticating a person's identity is just one determination from the full spectrum of cyber determinations that may be provided by the scalable universal full spectrum cyber determining machine of this disclosure.

SUMMARY OF THE DISCLOSURE

In one aspect, a scalable universal full spectrum cyber determining machine is provided which comprises at least one computing device that utilizes (a) criteria selected from criteria that may be utilized by the cyber determining machine, (b) selected useful information, (c) selected necessary programming, and (d) any other necessary resource, all of which being structured and utilized for providing at least one cyber determination;

wherein the at least one cyber determination is selected from the group consisting of the full spectrum of cyber determinations;

wherein the at least one cyber determination is utilized for at least one purpose;

wherein useful information is selected from the group consisting of the full spectrum of useful information that may be utilized by the cyber determining machine;

wherein useful information is derived from at least one member selected from the group consisting of (a) at one or more points in time, and (b) over at least one period of time;

wherein the full spectrum of useful information that may be utilized by the cyber determining machine includes useful information that was derived from at least one sensor observation;

wherein the at least one sensor observation provides useful information regarding at least one aspect of at least one subject of the at least one sensor observation;

wherein the at least one cyber determination regarding the at least one subject of at least one sensor observation is selected from the group consisting of the full spectrum of cyber determinations regarding subjects of sensor observations;

wherein the at least one aspect of at least one subject of at least one sensor observation is selected from the group consisting of the full spectrum of observable aspects regarding subjects of sensor observations;

wherein the at least one subject of at least one sensor observation is selected from the group consisting of the full spectrum of subjects of sensor observations;

wherein the cyber determining machine utilizes at least one observed characteristic regarding at least one aspect of the at least one subject of at least one sensor observation;

wherein the at least one observed characteristic is selected from the group consisting of the full spectrum of observable characteristics of subjects of sensor observations;

wherein the at least one sensor observation is at least one type of sensor observation selected from the group consisting of (a) visual sensor observations, (b) audible sensor observations, (c) thermal sensor observations, (d) olfactory sensor observations, (e) tactile sensor observations, and (f) any other type of sensor observation from the full spectrum of types of sensor observations;

wherein the at least one sensor observation has at least one characteristic selected from the group consisting of the full spectrum of characteristics of sensor observations;

wherein each scalable cyber determining machine may be configured, in regard to included resources, to fall at one point in the range of from a minimum to a maximum, wherein at the minimum the cyber determining machine includes only the resources that are needed for providing for the least complex, in regard to included necessary resources, of all cyber determination needs, and wherein at the maximum the cyber determining machine includes all of the resource that are needed for providing every cyber determination from the full spectrum of cyber determinations;

wherein the scalable universal cyber determining machine provides at least one determination selected from the group consisting of (a) at least one single cyber determination, (b) at least one intermittently provided cyber determination, and (c) at least one constantly provided cyber determination; and wherein the scalable cyber determining machine further comprises utilizing at least one part of at least one step selected from the group consisting of (a) a first series observation step utilizing at least one sensor observation, wherein at least one subject of the at least one first series observation has at least one previously determined aspect, the cyber determining machine recognizing at least one characteristic regarding the previously determined aspect, the at least one recognized characteristic being utilizable by the cyber determining machine in providing the at least one cyber determination, the cyber determining machine assigning designations representing (i) the at least one observation, (ii) the at least one known aspect of the at least one observation subject, and (iii) the at least one observed characteristic, the cyber determining machine including at least one first series observation record which includes the designations, (b) a second series observation step utilizing at least one sensor observation, wherein at least one subject of the at least one second series observation has at least one yet to be determined aspect, the scalable cyber determining machine recognizing at least one characteristic regarding the at least one yet to be determined aspect, the cyber determining machine assigning designations representing (i) the at least one observation, (ii) the at least one yet to be determined aspect of the at least one observation subject, and (iii) the at least one characteristic regarding the at least one yet to be determined aspect, wherein the cyber determining machine includes at least one second series observation record containing the designations, (c) a matching step matching at least one designation from at least one second series observation record with at least one designation from at least one first series observation record, (d) a comparing step comparing designations representing at least one second series observation record with designations representing at least one comparable first series observation record and providing at least one conclusion from the comparison, (e) a determining step wherein the cyber determining machine utilizes at least one selected from the group of: the at least one conclusion from the at least one comparing step; and, useful information, for making the at least one cyber determination, and (f) a reporting step providing at least one report regarding at least one aspect of at least one part of at least one cycle of operation of the cyber determining machine.

In some embodiments of the foregoing cyber determining machine, at least one sensor observation is selected from the group consisting of (a) visual sensor observations, (b) audible sensor observations, (c) thermal sensor observations, (d) olfactory sensor observations, (e) tactile sensor observations, and (f) any other type of sensor observation from the full spectrum of types of sensor observations.

In some embodiments of the foregoing cyber determining machine, the scalable cyber determining machine achieves at least one selected attainable level of accuracy goal for at least one cyber determination, and wherein the at least one attainable level of accuracy goal falls within the range extending from the smallest recognizable level of accuracy up to, and including, 100% accuracy.

In some embodiments of the foregoing cyber determining machine, the cyber determining machine provides for any possible level of observation participation by at least one person who is at least one subject of at least one sensor observation, and wherein the any possible level of observation participation ranges from the at least one person being present but not consciously or otherwise engaged in the at least one sensor observation, to the at least one person being an active and consciously engaged participant in the at least one sensor observation.

In some embodiments of the foregoing cyber determining machine, the cyber determining machine utilizes at least one observation selected from the group consisting of (a) at least one sensor observation which is of at least one characteristic of at least one observation subject, and which is observed at one or more points in time, and (b) at least one sensor observation which is of at least one characteristic of at least one observation subject, and which is observed over at least one period of time.

In some instances, at least one sensor observation occurs over at least one period of time and includes observation of at least one change that occurs to at least one observation subject over at least one period of time. In these instances, at least one change includes at least one aspect of at least one subject of at least one sensor observation selected from the group of sensor observations consisting of (a) visual sensor observations, (b) audible sensor observations, (c) thermal sensor observations, (d) olfactory sensor observations, (d) tactile sensor observations, and (f) any other type of sensor observation. Also in these instances, the cyber determining machine may include at least one person being the at least one observation subject, and wherein the at least one change that occurs to the at least one person is at least one change of at least one observable aspect of at least one part of at least one feature of the at least one person. Further in these instances, the at least one feature is selected from the group consisting of the head, face, mouth, eyes, eyebrows, nose, arms, hands, fingers, legs, feet, neck, torso, skin, heart, stomach, intestines, liver, kidneys, lungs, breath, vascular system, brain, spinal cord, neural system, skeleton, blood, and any other feature of a person from the full spectrum of features of a person where sensor observable changes occur.

In some embodiments of the foregoing cyber determining machine, the at least one cyber determination includes determination of any indicated measure that exists of at least one yet to be identified person being the same person as a known person, wherein the at least one determination ranges from determining the yet to be identified person absolutely is not the known person, through determining any intermediate indicated measure of probability that exists of the yet to be identified person being the known person, to determining the yet to be identified person absolutely is the known person.

Some embodiments of the foregoing cyber determining machine further comprise a repeating step in which the cyber determining machine selects at least one part of at least one first series observation record of at least one person for repetition by at least one yet to be identified person, wherein the at least one yet to be identified person performs the at least one repetition, wherein the cyber determining machine assigns designations representing (a) the at least one observation, (b) the at least one repetition, and (c) at least one characteristic regarding the at least one yet to be identified person. In some instances of these embodiments, the scalable cyber determining machine includes at least one second series observation record of the at least one repetition, and wherein the at least one second series observation record includes the designations assigned by the cyber determining machine.

In some embodiments of the foregoing cyber determining machine, the cyber determining machine further comprises searching available first series observation records of previously determined aspects of first series observation subjects until either every determination goal has been achieved, or there are no further first series observation records to search.

Some embodiments of the foregoing cyber determining machine further comprise utilizing useful information which is derived from at least one source other than at least one selected from the group of (a) at least one first series observation record, and (b) at least one second series observation record.

In some embodiments of the foregoing cyber determining machine, the cyber determining machine comprises at least one computing device utilizing selected criteria, selected information, selected programming, and any other necessary resource all of which being utilized for the purpose of accurately granting or denying access to at least one part of at least one resource selected from the group consisting of (a) the cyber determining machine (b) at least one cyber resource that is being utilized by the cyber determining machine, and (c) at least one resource that is utilizing the cyber determining machine.

Some embodiments of the foregoing cyber determining machine further comprise the cyber determining machine manipulating, in any way possible, the operations of at least one selected from the group consisting of (a) cyber determining machine utilized resources, and (b) the cyber determining machine itself; wherein the manipulating provides the cyber determining machine with selection of possible utilizations, wherein the manipulating is utilized for at least one purpose, and wherein at least one purpose for utilizing the manipulating includes aiding in achieving at least one cyber determination goal.

In some embodiments of the foregoing cyber determining machine, the cyber determining machine further includes cyber determining machine history, wherein the cyber determining machine history includes at least one cyber determining machine history record.

In some embodiments of the foregoing cyber determining machine, at least one observation record that was derived from at least one source other than the first series observation step may be included as at least one first series observation record.

In some embodiments of the foregoing cyber determining machine, at least one observation record that was derived from at least one source other than the second series observation step may be included as at least one second series observation record.

In some embodiments of the foregoing cyber determining machine, all or any part of the operations of the cyber determining machine are performed in any order.

In some embodiments of the foregoing cyber determining machine, the cyber determining machine includes at least one standard cyber determining machine designation representing at least one aspect of at least one operation of the cyber determining machine.

In another aspect, a scalable universal full spectrum cyber determining machine is provided which comprises:

deriving information from at least one point in time or over at least one period of time from a spectrum of information that includes at least one observed characteristic of at least one subject of at least one sensor observation, thereby obtaining derived information, wherein said at least one sensor observation is a type of sensor observation selected from the group consisting of (a) visual sensor observations, (b) audible sensor observations, (c) thermal sensor observations, (d) olfactory sensor observations, (e) tactile sensor observations, and (e) any other type of sensor observation;

the cyber determining machine, comprising at least one computing device, the cyber determining machine providing at least one cyber determination through the utilization of (a) criteria that may be utilized by the cyber determining machine, (b) derived information, and (c) any necessary programming and resources, wherein the cyber determining machine provides at least one cyber determination selected from the group consisting of (i) at least one single cyber determination, (ii) at least one intermittently provided cyber determination, and (iii) at least one constantly provided cyber determination; and, utilizing the at least one cyber determination for at least one purpose; wherein the scalable cyber determining machine further comprises utilizing at least one part of at least one step selected from the group consisting of (a) a first series observation step utilizing at least one sensor observation, wherein at least one subject of the at least one sensor observation has at least one previously determined aspect, the cyber determining machine recognizing at least one characteristic regarding the previously determined aspect, the at least one recognized characteristic being utilizable by the cyber determining machine in providing at least one cyber determination, the cyber determining machine assigning designations representing (i) the at least one observation, (ii) the at least one known aspect of at least one observation subject, and (iii) the at least one observed characteristic, the cyber determining machine including at least one first series observation record which includes the designations, (b) a second series observation step utilizing at least one sensor observation, wherein at least one subject of the at least one sensor observation has at least one yet to be determined aspect, the scalable cyber determining machine recognizing at least one characteristic regarding the at least one yet to be determined aspect, the cyber determining machine assigning designations representing (i) the at least one observation, (ii) the at least one yet to be determined aspect of the at least one observation subject, and (iii) the at least one characteristic regarding the at least one yet to be determined aspect, wherein the cyber determining machine includes at least one second series observation record containing the designations, (c) a matching step matching at least one designation from at least one second series observation record with at least one designation from at least one first series observation record, (d) a comparing step comparing designations from at least one second series observation record with designations from at least one comparable first series observation record and providing at least one conclusion from the comparison, (e) a determining step wherein the cyber determining machine utilizes at least one from the group of: at least one conclusion from at least one comparing step; and, useful information, for making at least one cyber determination, and (f) a reporting step providing at least one report regarding at least one aspect of at least one part of at least one cycle of operation of the cyber determining machine.

DETAILED DESCRIPTION

Figure 1:
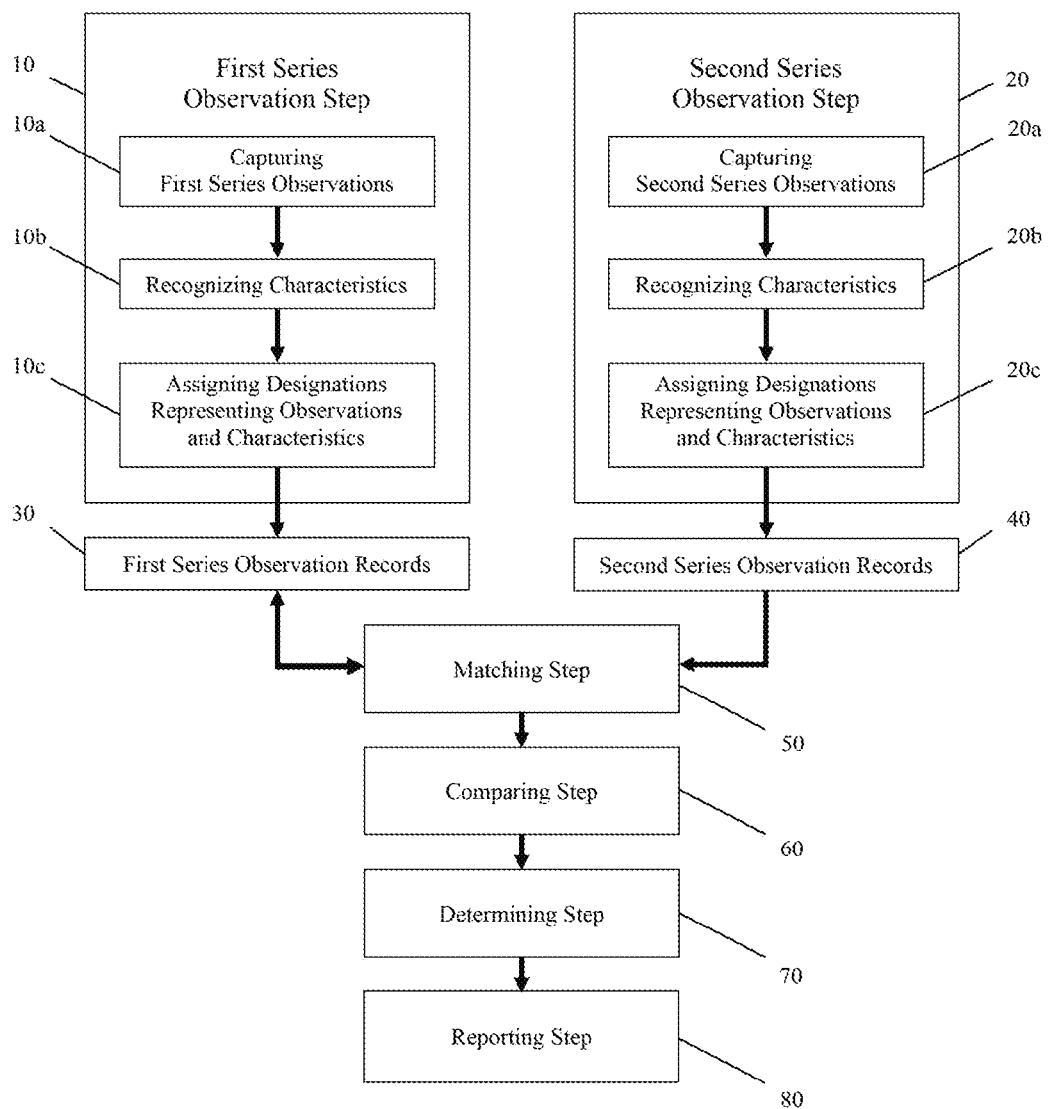
FIG. 1 is a flowchart which illustrates one particular, non-limiting embodiment of the operations of the cyber determining machine disclosed herein.

At present, we live in a technologically interconnected world where the vast spectrum of available cyber resources is ever widening. Over time, our technologically interconnected world appears to be destined to provide every possible cyber resource that humanity could ever want or need. Included in those cyber resources, and in accordance with the teachings herein, will be a scalable universal full spectrum cyber determining machine that may provide not only the presently needed 100% accurate cyber identity determinations of a person, but may also provide every other cyber determination our world could ever want or need. A further discussion of this universal concept is disclosed in the above-referenced U.S. Pat. No. 8,832,794 (Aronson).

In light of the foregoing, there is presently an unanswered need in the art for a cyber determining machine that:

provides cyber identity determinations of a known person and an unidentified person being the same person at any attainable level of accuracy, including 100% accuracy;

utilizes any number of observed, unique biological characteristics of a known person or an unidentified person for making cyber identity determinations;

utilizes observations of a person who is not consciously engaged in a cyber identity determination;

provides single cyber identity determinations, intermittently provided cyber identity determinations, and constantly provided cyber identity determinations of a person or any other observation subject;

performs observations where an unidentified person repeats a portion of a selected, previously captured observation of a known person;

utilizes any available useful observation for making cyber determinations;

utilizes any number of observed, unique characteristics of a known subject of an observation or an unidentified subject of an observation for making cyber determinations;

provides and utilizes standard designations for accurately and consistently representing any aspect of the operations of the cyber determining machine;

provides any attainable level of security and privacy, including absolute security and privacy, for any information and resources (a) that are utilized by the cyber determining machine, and (b) that are utilizing the cyber determining machine;

utilizes any useful criteria for observing, recognizing, matching, comparing, determining, reporting, or any other aspect of providing cyber determinations;

utilizes observations made other than by the cyber determining machine for providing cyber determinations;

utilizes useful information of any type, from any source, for providing cyber determinations;

utilizes more than one recognized characteristic for providing cyber determinations;

utilizes comparisons of more than one matching characteristic to achieve a predetermined attainable cyber determination goal; and is scalable in regard to included resources, to fall at any one point in the range of from a minimum to a maximum, wherein at the minimum the cyber determining machine includes only the resources that are needed for providing for the least complex (in regard to included necessary resources) of all cyber determination needs, and wherein at the maximum the cyber determining machine includes all of the resource that are needed for providing every cyber determination from the full spectrum of cyber determinations;

A technologically interconnected world that is capable of providing every possible cyber resource humanity could ever want or need can only be built upon the foundation of a secure and safe cyber environment. Utilization of accurate cyber identity determinations of a person is an indispensable step in providing a secure and safe cyber environment.

Therefore, there is a need in the art for a scalable universal full spectrum cyber determining machine that provides any level of attainable accuracy in cyber identity determinations of a person, including 100% accurate cyber identity determinations of a person.

The foregoing needs, and other needs, may be met with the machine, systems and methodologies disclosed herein.

DEFINITIONS

The following terms, as used in the present disclosure, have the meanings indicated.

Absolutely Unique: occurring at a ratio of one to the total (non-zero) number of identity files.

Biological characteristic: any characteristic of a biological organism, including a person, that can be observed and reported upon.

Unique biological characteristic: any single observable biological characteristic of a biological organism, or any combination of observable biological characteristics of one biological organism (e.g., a biological fingerprint), that can be considered to be unique, or absolutely unique, to the observed biological organism.

Capture/capturing: the use of cyber resources for acquiring and recording cyber sensor observations.

Characteristic: a recognized aspect regarding another aspect of an observation that can be assigned at least one designation for further utilization.

Characteristics: at least one characteristic.

Constant/constantly: occurring at any selected frequency that provides for essentially continuous determinations.

Criteria: a group of options containing at least one member.

Cyber: utilizing non-biological processing of programming. Anything such as devices, programming, processes, or files that utilizes non-biological processing of programming in any way.

Full spectrum: the complete set of possible choices for a given variable or option, which includes the subset of available choices for any given variable or option. Thus, for example, the full spectrum of cyber resources is the complete set of possible cyber resources, which includes all available cyber resources.

Identity determination: a determination of (a) previously unknown identity, or (b) authentication of claimed identity.

Identity determinations: at least one identity determination.

Known person: a person who is at least one known subject of at least one first series observation record.

Or: unless otherwise specified herein, the term "or" shall be construed as the logically inclusive "or". Hence, the statement "A or B" shall be true if only A is true, if only B is true, or if both A and B are true. The notation "A and/or B" explicitly refers to the logically inclusive "or".

Recognized: any aspect of an observation or a subject of an observation that is identified for further utilization.

Selected from: "from" or "selected from". The expression "x is selected from the group G", where x is a group member variable and G is the group, is legal terminology (Markush language) which is merely intended to specify possible values for x, and which does not by itself suggest or imply an actual selection step in any methodology or system this terminology is being used to describe.

Series: a group of at least one.

Unidentified person: one single person who is a subject of a second series observation; a person who has not been determined, utilizing predetermined criteria, to be the same person as a known person.

Unique: occurring at a selected ratio other than the ratio of absolutely unique.

Overview

The following brief overview pertains to the scalable universal full spectrum cyber determining machine in general which is disclosed herein. However, it also pertains, in part, to the more specific utilization of the cyber determining machine for providing accurate and reliable cyber identity determinations of a person.

In accordance with the teachings herein, a scalable universal full spectrum cyber determining machine is disclosed that may accurately and reliably provide one or more cyber determinations from a full spectrum of cyber determinations. The systems and methodologies disclosed herein for providing accurate cyber determinations regarding the identity of a person provide the foundation upon which a secure, safe, and private technologically interconnected world may be built.

Additionally, through utilization of the accurate and reliable cyber identity determinations of a person that are provided by the cyber determining machine disclosed herein, cyber environments may soon change from environments of unparalleled chaos, to a unified and orderly technologically interconnected environment that provides all users with reasonable levels of cybersecurity, cyber safety, and cyber privacy.

The following list includes a portion of the resources and features from the full spectrum of resources and features that may be provided by the scalable universal full spectrum cyber determining machine disclosed herein:

a. cyber determinations regarding some or all of the full spectrum of subjects of cyber determinations;
b. cyber determinations that may fill some or all of the full spectrum of needs for cyber determinations;
c. cyber determinations that may be provided at any attainable level of accuracy including 100% accuracy;
d. cyber determinations that may utilize some or all resources from the full spectrum of available useful resources;
e. cyber determinations that may utilize some or all information from the full spectrum of available useful information;
f. cyber determinations that may utilize some or all observations from the full spectrum of available useful observations;
g. cyber determinations that may utilize some or all observable unique characteristics of a subject of an observation from the full spectrum of observable unique characteristics of subjects of observations;
h. cyber determinations that may utilize some or all criteria from the full spectrum of useful criteria;
i. cyber determinations that may utilize standard designations for accurately and reliably representing any aspect of the operations of the cyber determining machine;
j. cyber determinations that may be provided one single time, or provided intermittently, or provided constantly;
k. utilization of the cyber determining machine for the purpose of accurately granting or denying access to any from the list of (i) the cyber determining machine itself, (ii) cyber resources that are being utilized by the cyber determining machine, and (iii) cyber resources that are utilizing the cyber determining machine;
l. security and privacy, which may include absolute security and privacy, for some or all cyber resources;
m. observations of a person, where the person as a subject of the observation may be at any one point in a range of, from being present but not being consciously engaged in an observation, to being consciously engaged and participating in an observation;
n. scalability in regard to included necessary resources, wherein a cyber determining machine may be specifically configured to include only the resources that are necessary to provide for cyber determination needs at any one point in a range of, from providing for the smallest of all cyber determination needs in regard to included necessary resources, to providing for the greatest of all cyber determination needs in regard to included necessary resources;
o. ease of use in all phases of operations;
p. persistence in attempting to achieve selected cyber determination goals;
q. utilization of one or more observed unique biological characteristics of a person for providing cyber identity determinations of the person;
r. alteration of operations of the cyber determining machine itself or any resources being utilized by the cyber determining machine for any purpose including the purpose of aiding in attaining at least one cyber determination goal;
s. utilization of useful information that was derived from any source;
t. utilization of a unique combination of simultaneously occurring observed characteristics for the purpose of providing cyber determinations of a person or any other subject of an observation; and, u. utilization of a unique combination of observed characteristics that occur over any period of time for the purpose of providing cyber determinations of a person or any other subject of an observation.

Proper utilization of cyber identity determinations of a person as disclosed herein (identity determinations that may be highly accurate, including being 100% accurate) may, for the first time ever, enable the world to enjoy the benefits of a secure, safe, and private technologically interconnected cyber environment. Among the many benefits that may be derived from the utilization of the cyber determining machine disclosed herein is its ability to determine and report on any indicated measure of probability that exists of an unidentified person being the same person as one specific known person. At one end of the full spectrum of these cyber identity determinations is the determination that an unidentified person absolutely is the same person as a specific known person, and at the other end of the spectrum is the determination that an unidentified person absolutely is not the same person as a specific known person.

Through the utilization of cyber resources and predetermined criteria, a preferred embodiment of the cyber determining machine disclosed herein provides cyber determinations by comparing an unidentified subject of an observation with a known subject of an observation. The cyber determining machine utilizes predetermined criteria for every aspect of the operations of the cyber determining machine where criteria are used. The cyber determining machine may also provide and utilize standard designations to represent observations, characteristics and other aspects of the operations of the cyber determining machine.

The scalable universal full spectrum cyber determining machine (a) may be configured as a single self-contained device, (b) may be configured to include more than one interconnected resource, (c) may exclusively be a stand-alone device, (d) may be an integral or remote part of a larger device or system, (e) may utilize all or any part of the resources of another device or system, (f) may be virtual or physical or any combination thereof, (g) may be stationary or mobile or a combination thereof, (h) may be located in one or more places, (i) may utilize resources that may be interconnected in any way, and (j) may utilize resources, other than the resources of the cyber determining machine itself, for any part of the operations of the cyber determining machine.

FIG. 1 depicts a first particular, non-limiting embodiment of the operations of the scalable universal full spectrum cyber determining machine in accordance with the teachings herein for providing cyber determinations from the full spectrum of cyber determinations. The operations of the cyber determining machine depicted herein, which uses suitable cyber resources and predetermined criteria, may commence by utilizing all or any part of a first series observation step 10 performed on a known subject of an observation. The first series observations step 10 includes capturing at least one first series observation 10a of the known first series observation subject, recognizing characteristics 10b from the captured observation, and then assigning designations 10c representing the observation and the characteristics from the observation. These designations may then be included as a part of the first series observation records 30 that represents the observed cyber identity of the known subject.

The cyber determining machine may further include utilization of all or any part of a second series observation step 20 performed on an unknown subject of a second series observation. The second series observation step 20 includes capturing at least one second series observation 20a of the unknown subject, recognizing characteristics 20b from the captured observation regarding the unknown subject, and then assigning designations 20c representing the observation and the characteristics from the observation. These designations may then be included in the second series observation records 40, which represents the cyber designations that were derived from the second series observation of the unknown subject.

The cyber determining machine may interact with utilized cyber resources to control the operations of those resources for any purpose including (a) the purpose of capturing any possible observations, and (b) the purpose of providing any useful variation of the operation of cyber resources.

Any step of the operations of the cyber determining machine, or any portion thereof, may be performed in any order or sequence.

Operating in any usable order or sequence, and utilizing all or any part of at least one of the following steps, the cyber determining machine may:

a. utilize useful observations and useful information from any source;
b. determine and utilize the level of determination accuracy that has been achieved;
c. determine and utilize a measure of adequacy of available resources;
d. capture first series observations or second series observations;
e. recognize useful characteristics from observations;
f. utilize recognized characteristics from any observation;
g. utilize at least one unique characteristic for providing cyber determinations;
h. assign designations to recognized characteristics;
i. determine which, and the order in which, recognized characteristics will be utilized for comparing or determining;
j. match observations and recognized characteristics from second series observation records, during a matching step 50, with corresponding comparable observations and recognized characteristics from first series observation records;
k. determine and provide conclusions as to the indicated measure of comparison between characteristics from the second series observation records and characteristics from the first series observation records during a comparing step 60;
l. select which conclusions from comparing will be utilized for determining;
m. utilize (a) conclusions from comparing, or (b) information, for providing cyber determinations;
n. provide cyber determinations that may include cyber identity determinations regarding any indicated measure of probability that exists of a known person and an unidentified person being the same person during a determining step 70; and,
o. report on any aspect of the operations of the cyber determining machine during a reporting step 80.

Additionally, based upon predetermined criteria, the cyber determining machine may be persistent in attempting to attain a cyber determination goal. As an example, should a determination based upon conclusions from comparing a first characteristic of a person not result in the cyber determining machine achieving a selected cyber identity determination goal, then the cyber determining machine may continue the comparing and determining until the selected cyber identity determination goal is achieved or there are no further first and second series observation records to compare.

Should a determination based upon conclusions from comparing all available useful characteristics of the unidentified person not result in determining a selected identity determination goal, then the cyber determining machine may utilize at least one additional observation of the unidentified person to add to the second series observation records of the unidentified person.

The cyber determining machine may select a portion of a first series observation record of a known person to be repeated by the unidentified person for inclusion in the unidentified person's second series observation records.

In order for the cyber determining machine to capture observations that are most likely to aid in achieving a selected determination goal, the cyber determining machine may alter any operational aspect that may be altered of any cyber resource that the determining machine is utilizing for capturing observations.

Description

The scalable universal full spectrum cyber determining machine disclosed herein may be utilized to merge the future with the present, which may be further appreciated after reading the following vision of a technologically interconnected future.

We live in a technologically interconnected world where vast cyber resources presently exist. Within this technologically interconnected world, we utilize cyber resources from a full spectrum of available cyber resources. This full spectrum of available cyber resources is ever widening, and, over time, our technologically interconnected world appears to be destined to provide every possible cyber resource that humanity could ever want or need. When that time comes, the entire body of cyber resources will include—and will rely heavily upon—a scalable universal full spectrum cyber determining machine (such as the scalable universal full spectrum cyber determining machine of the present disclosure) that may provide not only essentially 100% accurate identity determinations of a person, but also every other cyber determination our world could ever want or need.

To more fully understand the implications of the utilization of the cyber determining machine of the present disclosure, it is helpful to see its relationship to (a) co-pending U.S. patent application Ser. No. 14/447,283, filed Jul. 30, 2014 entitled "Single-Point-of-Access Cyber System" (b) U.S. patent application Ser. No. 13/702,537 filed on Mar. 4, 2014, entitled "Single-Point-of-Access Cyber System" and, (c) U.S. Pat. No. 8,832,794 issued on Sep. 9, 2014, entitled "Single-Point-of-Access Cyber System", each having the same inventor.

The core operations of a preferred embodiment of the cyber determining machine may best be disclosed through a particular, detailed and non-limiting example of the utilization of this cyber determining machine for the purpose of providing a single selected identity determination that an unidentified person and a known person are the same person. One of many predetermined criteria utilized for performing this cycle of the utilization of the cyber determining machine is that the full resources that are available to the cyber determining machine should be utilized in any way possible to persistently work towards accomplishing the selected cyber identity determination goal.

In one scenario, a "known person" owns a portable computer. The cyber determining machine is configured to be an integral part of the known person's portable computer. The cyber determining machine part of the operations of the known person's portable computer is utilized, in part, for providing identity determinations that may then be utilized to exclusively grant only the known person access to further use of his or her portable computer's resources. The portable computer may utilize, for any purpose, the known person's personally configured and built cyber determining machine. In addition, the portable computer includes a microphone and a camera, with adjustable operations, that the cyber determining machine may utilize and also control.

The cyber determining machine utilizes observations of the known person that come from what may be a vast collection of observations that make up the known person's first series observation records. The first series observation records of the known person are exclusively made up of observations that include the known person as a subject of the observation. The known person's first series observation records represent the cyber identity of the known person.

A cycle of the utilization of the cyber determining machine is initiated by an unidentified person requesting use of the known person's portable computer.

Every aspect of the operation of the cyber determining machine utilizes predetermined criteria. Criteria from a full spectrum of criteria may be predetermined by the known person, or criteria may be predetermined as an integral part of the operations of the cyber resources that were selected for use, or criteria may be predetermined as a part of the operations of the cyber determining machine, or criteria may be predetermined utilizing any other means for selecting criteria, or any combination thereof. Selection of anything may also constitute selecting criteria.

Criteria are selected choices of who, when, where, what, why, or how as each relates to any aspect of the cyber determining machine and its operations. Providing a choice of any possible criteria, and any criteria being possible, may well be the most important feature that cyber resources have to offer. The cyber determining machine disclosed herein may take full and best advantage of this particular cyber feature by providing any user with a choice of selection of available criteria regarding any aspects of his or her utilization of the cyber determining machine.

In the instance of this cycle of the utilization of the cyber determining machine, the cyber determining machine, utilizing predetermined criteria, utilizes the computer's camera to capture an image of the unidentified person. The cyber determining machine, again using predetermined criteria, utilizes the zoom feature of the camera to closely frame an image of only the face of the unidentified person in order to provide an observation that would be most likely to aid in achieving the selected cyber identity determination goal.

As a part of either series of observations, utilizing cyber resources and predetermined criteria, the cyber determining machine recognizes useful characteristics of any kind from the observations.

The cyber determining machine may provide and utilize a standard set of designations for accurately and reliably representing any aspect of the cyber determining machine and its operations.

Utilization of one and only one standard set of designations is an indispensable part of accurately, reliably and consistently providing cyber determinations, while utilizing any available observation or cyber resources from any place on the planet. Also included is the strategy of providing, on a worldwide basis, extremely consistent and accurate assignments of standard designations to every recognized aspect of each and every observation and observed characteristic.

Designations that accurately and reliably represent the observation and observed characteristics, including designations representing the captured image of the unidentified person's face, are assigned and then included in second series observation records for utilization in this cycle of the operation of the cyber determining machine. In addition, designations are accurately and consistently assigned, according to a cyber determining machine standard, so that designations representing observations and recognized characteristics from either series of observations may be universally utilized across the entire technologically interconnected cyber environment where the cyber determining machine is utilized.

The cyber determining machine utilizes predetermined criteria for matching the unidentified person's observations and characteristics from second series observation records with at least one comparable first series observation record of the known person.

In the instance of this cycle of the utilization of the cyber determining machine, predetermined criteria call for selecting and then utilizing one or more comparable observations from the first series observation records of the known person. Further, the one or more selected observation records should be the most likely of all available observation records to aid in accurately achieving the selected cyber identity determination goal.

Through the incredible speed and power of the operations of cyber resources, any large number of criteria may collectively or selectively be utilized for any aspect of the operations of the cyber determining machine.

In the instance of this cycle of the utilization of the cyber determining machine, predetermined criteria may utilize parameters such as time, date, temperature, light sources, light levels, the portion of the unidentified person that was observed, and the clarity of observation for matching the second series observation records of the unidentified person with at least one comparable first series observation record of the known person.

The cyber determining machine provides final determinations for many aspects of each observation at the time when designations are assigned to recognized characteristics. For example, a final determination may be provided that a known person who was the subject of an observation had red hair, or hazel eyes, or a particular geometry and ratio of movement between joints in a finger while opening or closing a hand, or any other characteristic.

Further, when utilizing an observation that has more than one person as a subject of the observation, the cyber determining machine may exclude from further determinations any person who is a subject of the observation who has been determined to not fit certain criteria. For example, in keeping with the previous example, the cyber determining machine may exclude from further determinations any person who has been determined to have hair that is not red or eyes that are not hazel. Also, based upon predetermined criteria, an unidentified person may be determined to absolutely not be the same person as the known person if it was determined that the unidentified person did not have red hair or hazel eyes.

Utilizing cyber resources and predetermined criteria, matched observation records of the unidentified person and the known person are compared by the cyber determining machine. Any predetermined criteria may be utilized by the cyber determining machine for any aspect of comparing observations.

Utilizing cyber resources and predetermined criteria, conclusions from comparing observation records, along with any useful information, may be utilized by the cyber determining machine for providing cyber determinations. Any predetermined criteria may be utilized by the cyber determining machine for any aspect of providing cyber determinations.

As a specific example, suppose that in the instance of this cycle of utilization of the cyber determining machine, an unidentified person is wearing large dark glasses that prevent the cyber determining machine from utilizing any comparison from the entire area of his or her eyes. Suppose further that the unidentified person is wearing a hat that covers the area where the known person has a small scar crossing a pea-sized birthmark. As a result, this very unique biological characteristics of the known person cannot be utilized for making a cyber identity determination.

In such a case, the conclusion from comparing a first set of matched characteristics may not provide a cyber determination that meets the identity determination goal of this cycle of the utilization of the cyber determining machine. Hence, following predetermined criteria, the cyber determining machine continues to utilize conclusions from the comparison of characteristics until the goal of this cycle of the utilization of the cyber determining machine is attained, or until there are no further conclusions from the comparing step to utilize.

In the present example, the goal of this cycle of the utilization of the cyber determining machine has not been attained. Hence, the cyber determining machine selects utilization of a further observation of the unidentified person's left hand. In this example, the cyber determining machine requests that the unidentified person fully open his or her left hand in the presence of the computer's camera, with the fingernails facing the camera, and that the properly positioned hand be slowly closed and opened again fully.

The unidentified person, still wanting to gain access to the resources of the known person's computer, complies with the request from the cyber determining machine which was presented to the unidentified person on the computer's image display screen. The cyber determining machine operates the zoom on the computer's camera to provide the optimum captured observation for utilization with this cycle of the utilization of the cyber determining machine.

In this instance, the cyber determining machine utilizes comparisons of informational representations regarding geometry of movement and also the visual presence of the moving hand and fingers for providing this cyber identity determination.

The selected second series observation record provides an overabundance of unique biological characteristics that may be utilized for providing the cyber identity determination, far more than are needed for determining, with essentially 100% accuracy, that the unidentified person and the known person absolutely are the same person. Just a portion of the characteristics that were recognized from the opening and closing of a single finger may be used to achieve the selected cyber determination goal for this cycle of the utilization of the cyber determining machine.

Once the selected determination has been attained, the cyber determining machine reports the determination, utilizing cyber resources and any predetermined criteria for any aspect of reporting.

In the instance of this cycle of the utilization of the cyber determining machine, the determination is reported to a history that the cyber determining machine maintains, and also to programming running on the portable computer of the known person whereby, having received the report from the cyber determining machine that the unidentified person absolutely is the known person, the computer then grants the known person exclusive access to use of the resources of his or her own computer. History, or any other aspect of the operations of the cyber determining machine, may be stored in volatile or non-volatile memory, e.g., in one or more storage modules that are utilized by one or more computers.

Figure 2:
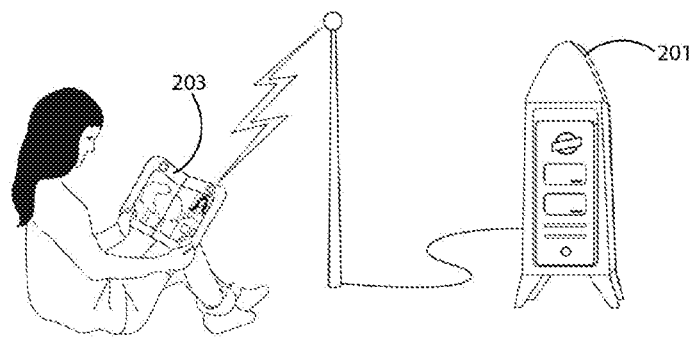
FIG. 2 is an overview diagram of a person utilizing an input output device for gaining access to her remotely located point of cyber access computer. The cyber determining machine is an integral part of the point of cyber access computer, and the cyber determining machine is utilized for providing identity determinations of a person as a prerequisite for gaining access. The point of cyber access computer and the input output device are components of the system described in U.S. Pat. No. 8,832,794 (Aronson), entitled "Single-Point-of-Access Cyber System," which is incorporated herein by reference in its entirety. This diagram illustrates one particular, non-limiting embodiment of the cyber determining machine disclosed herein.

FIG. 2 depicts a non-limiting embodiment of a person utilizing an input output device for gaining access to her remotely located point of cyber access computer. The cyber determining machine is an integral part of this point of cyber access computer, and the cyber determining machine is utilized for providing identity determinations of a person as a prerequisite for granting access to the person. The point of cyber access computer and the input output device are components of the "Single-Point-of-Access Cyber System".

Figure 3:
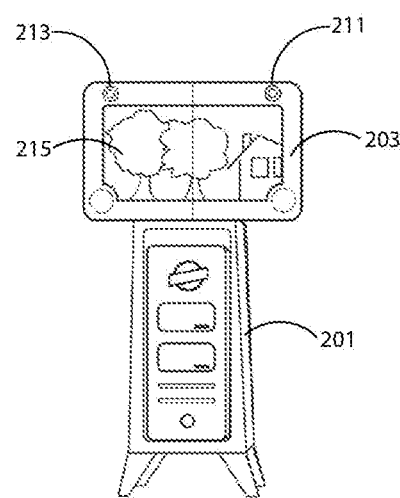
FIG. 3 is an overview diagram of a point of cyber access computer that comprises an integral input output device and also an integral cyber determining machine. This diagram illustrates one particular, non-limiting embodiment of the cyber determining machine disclosed herein.

FIG. 3 depicts a non-limiting embodiment of a point of cyber access computer with an integral input output device and also an integral cyber determining machine.

In order to best demonstrate a few selected further utilizations of the systems and methodologies disclosed herein, it is helpful to consider the future, which may be illustrated with reference to the Single-Point-of-Access Cyber System. This is advantageous in that the Single-Point-of-Access Cyber System is a technologically interconnected environment that may provide for the fullest and best utilization of a scalable universal full spectrum cyber determining machine.

To begin with, the Single-Point-of-Access Cyber System architecture provides each person with one remotely accessible point of cyber access computer, 201. Each person may utilize any mobile or stationary remote terminal-type-of device that is called an input output device 203, to gain secure and private access to his or her own remotely located point of cyber access computer 201.

Each person's own remotely located point of cyber access computer may utilize the cyber determining machine disclosed herein for providing cyber identity determinations with with a high degree of accuracy, up to and including 100% accuracy. In this example, when 100% accuracy has been achieved, the unidentified person will be determined to be absolutely the same person as the proprietary user of the point of cyber access computer, which must occur before the previously unidentified person is granted access to the personal and private resources of his or her own remotely located point of cyber access computer.

Enabled by the cyber identity determination resources of this cyber determining machine, the Single-Point-of-Access Cyber System may be utilized to provide a technologically interconnected world with an environment that provides for the highest attainable levels of cyber security, cyber safety, and cyber privacy.

A cycle of utilization of the cyber determining machine is initiated by an unidentified person who utilizes any input output device 203 to call up his or her own remotely located point of cyber access computer 201, and then request access to the personal and private resources of his or her own point of cyber access computer.

Each person's point of cyber access computer is configured to where only one specific person can gain access to its personal and private resources, and only after that person has, with up to 100% accuracy, been determined to be the proprietary user of the point of cyber access computer. In this instance, the cyber determining machine is configured to be an integral part of the point of cyber access computer. The cyber determining machine component of the point of cyber access computer requests, through use of the input output device's image display screen 215, that the unidentified person requesting access repeat a phrase the cyber determining machine has randomly selected from the first series observation records of the proprietary user of the point of cyber access computer.

The cyber determining machine may utilize any criteria for selecting the phrase to be repeated. For example, in the instance of this cycle of the utilization of the cyber determining machine, the phrase to be repeated may be selected based upon camera observations from the utilized input output device in regard to light levels, light source, pose, camera angle, movement of the unidentified person, movement of the input output device, and a number of other cyber determining machine selected criteria.

The unidentified person repeats the cyber determining machine selected phrase for the microphone 213 and camera 211 of the input output device 203. The cyber determining machine, utilizing predetermined criteria and available cyber resources, controls the operations of the microphone 213 and the pan, tilt, and zoom modes of the camera 211 of the input output device in order to capture the optimum second series observation of the unidentified person.

The cyber determining machine recognizes characteristics from this observation and accurately assigns designations to recognized characteristics. The designations representing the observation and recognized characteristics are included in unidentified person's second series observation records.

The designations representing the repeating of the selected phrase are then compared, utilizing the predetermined criteria of first matching the peak and valley graph representations of the sound of the voice from the repeating with the peak and valley graph representations of the voice from the proprietary user of the point of cyber access computer originally speaking the phrase that was repeated. Then, if a match exists, the cyber determining machine further compares the position of the mouth at various landmarks such as high peaks in the peak and valley graph.

In this instance, the cyber determining machine determines that the unidentified person requesting access absolutely is the proprietary user of the point of cyber access computer and the proprietary user is thereby granted exclusive access to the personal and private resources of his or her own remotely located point of cyber access computer 201.

It is preferred to utilize, environment wide, a set of identity determination criteria that provide a person with secure, safe, and private access to his or her own remote or local computer or cyber resources. To achieve this secure, safe and private cyber environment, it is desirable to utilize criteria that require an essentially 100% accurate identity determination be made of a person before granting that person access to his or her own computer or cyber resources. It is further recommended that criteria be utilized that require constant identity determinations to be made of the same person while that person is utilizing, in any way, his or her own computer or cyber resources.

In light of the foregoing, the Single-Point-of-Access Cyber System not only requires that a person be accurately determined to be the proprietary user of his or her point of cyber access computer before the person may gain access to its personal and private resources, but the Single-Point-of-Access Cyber System also preferably requires the person utilizing his or her point of cyber access computer be constantly determined to be the proprietary user of his or her point of cyber access computer while that person is using, in any way, his or her own point of cyber access computer.

One example of how the cyber determining machine may provide constant identity determinations utilizes sequential video images of the eyes of the user of the input output device. Predetermined criteria call for a comparison of the most current sequential image of the eyes with the immediate prior image of the eyes at a frequency that would not allow the observed user to be changed. This method provides a weak, but accurate, constant identity determination. Additionally, for this cycle of utilization of the cyber determining machine, predetermined criteria call for a 100% accurate identity determination to be made each time the person who is using the input output device blinks his or her eyes.

Point of cyber access computers may be primarily voice operated, thereby providing the cyber determining machine with a vast collection of first series observation records of the proprietary user of the point of cyber access computer when he or she is speaking. In addition, should a person be wearing dark glasses that prevent the use of the person's eyes for making identity determinations, then the cyber determining machine may utilize observations of the person's mouth for providing identity determinations. The cyber determining machine may also utilize analysis of observations of the unique characteristics of the mouth that were captured at a frequency that would provide essentially constant determination as to whether or not the same mouth was the subject of the observation. Moreover, an essentially 100% accurate identity determination may be provided when this person speaks, wherein the cyber determining machine compares a portion of what was said by the unidentified person with a comparable observation of the proprietary user of the point of cyber access computer speaking the same words.

In the event that it is not possible to utilize either of the prior strategies for providing constant identity determinations of the user of an input output device, then the cyber determining machine may utilize any possible aspect of an observation of the user of the input output device to persistently attempt to attain an essentially 100% accurate determination that the person who is using the input output device is the proprietary user of the point of cyber access computer.

A point of cyber access computer from the Single-Point-of-Access Cyber System is a remotely accessible computer that may securely and privately provide almost every cyber resource the proprietary user of the point of cyber access computer could ever want or need.

At the point in the future when it is possible to utilize almost every cyber resource humanity could ever want or need, a person may utilize his or her own remotely located point of cyber access computer to navigate through the maze of a large open market area of an ancient and irregular part of a city in a country in which that person has never before been. The point of cyber access computer will utilize the cyber determining machine to aid the proprietary user of the point of cyber access computer in navigating the maze.

The point of cyber access computer may utilize a cyber determining machine and cyber positioning resources to determine the general geographic location of the person. The cyber determining machine may then utilize visual observations that are provided by available public cameras to first find the person from the large group of people at the market, then accurately confirm that the found person was the proprietary user of the computer, and then, as much as is possible, the cyber determining machine will provide constant identity and location determinations for the person as the person moves through the market. The cyber determining machine provided real-time information about the location of the person, will in turn be utilized by the person's point of access computer for providing the person with the best possible aid in navigating through the maze of the busy congested market.

This brings up another feature of a preferred embodiment of the scalable universal full spectrum cyber determining machine: the ability to provide cyber determinations not only of a person, but also of any other recognizable biological observance, any recognizable non-biological observance, and any recognizable environment observance.

At times, utilizing criteria that require providing constant observation, no part of the person may be observable. However, there may be visible parts of anything that has previously been on or about, the body of the person that may be utilized by the cyber determining machine for visually following the otherwise unidentifiable person as he or she walks through the market.

At a time when there is a cyber environment that provides every resource a person could want or need, cyber resources may be utilized to observe a rock wall and, through utilization of a cyber determining machine, the cyber resources may provide accurate information about the location of the wall, when the wall was built, what type of materials were used, and from where the rocks originally came.

The scalable universal full spectrum cyber determining machine-enabled, secure, safe, and private technologically interconnected environment of the Single-Point-of-Access Cyber System may be utilized to provide the planet with vast new cyber resources. Among those resources will preferably be devices that utilize sensors to regularly monitor any selected aspect of our personal health.

The preferably voice operated point of cyber access computer may be fully utilized through use of an input output device that is similar in size and worn similarly to a wristwatch. Although an input output device with an image display screen of such a small size would require intermittent use of a larger image display screen, a wristwatch-configured input output device may nonetheless provide the greatest all-around utility of any input output device configuration, in part because a wristwatch-configured input output device that includes one or more health sensors may be utilized in conjunction with a cyber determining machine to securely and privately monitor and report to one's point of cyber access computer any possible health observations (both internally and externally).

A person's own point of cyber access computer may then utilize those cyber determining machine health observations for providing the person (perhaps through use of his or her wristwatch-configured input output device) reports of any health information that the person may want or need to be aware of.

Through utilization of the security, safety and privacy that is enabled by use of identity determinations that are provided by a determining machine and the resources of the Single-Point-of-Access Cyber System, it will be possible to securely and privately provide all, or any part, of a person's own personal and private health information to health care providers of choice so that those health care providers may have the ability to better provide the person with the best of all possible health care outcomes.

Additionally, it may be possible for a person to anonymously provide all, or any part, of his or her health information to selected others for health-related research.

Utilizing a wristwatch-configured input output/health monitoring device that is working in conjunction with a cyber determining machine, each person may enjoy the benefits of secure and private uninterrupted observations of any number of measures of his or her health. Moreover, using the same wristwatch-configured input output/health monitoring device, he or she may also enjoy the benefits of utilization of any of the resources of his or her own remotely located cyber determining machine and point of cyber access computer. Wow!

Looking to the present again, and more particularly cybersecurity's present need for an easy to use, versatile cyber determining machine that provides essentially 100% accurate cyber identity determinations of a person, it is clear that prior art cybersecurity cyber identity measures fail to meet present needs for identity determinations. This is so because prior art cyber identity determination measures do not go so far as to identify each person by means of utilizing unique biological characteristics of the person that cannot be replicated by any others. The cyber determining machine of the present disclosure preferably provides identity determinations of any person by utilizing unique biological characteristics of the person, unique biological characteristics that cannot be replicated by any other person or device.

The scalable universal full spectrum cyber determining machine, as utilized for providing essentially 100% accurate cyber identity determinations of a person, preferably utilizes as many unique biological characteristics of a person as are necessary to achieve an attainable selected identity determination goal. Many examples of unique biological characteristics of a person have previously been addressed. However, when both internal and external observations of a person are utilized in any combination, there are a very large number of possible combinations of unique biological characteristics that may be utilized for providing identity determinations of just one person. With every unique biological characteristic of a person that has been observed also exists one means for accurately matching second series observation records of an unidentified person with the first series observation records of a known person.

The cyber determining machine disclosed herein may provide any cyber determination from a full spectrum of cyber determinations of not only a person, but also any other biological, non-biological, or environment observations.

Within the full spectrum of identity determinations of a person are a multitude of determinations that fall short of providing a determination that an unidentified person and a known person absolutely are the same person. For example, there are determinations of hair color, moles, wrinkles in skin, freckles, geometry of motion at joints, scars, height, eye color, and so forth.

There are also identity determinations of any measure of probability that exists of a known person and an unidentified person being the same person. This type of identity determination is useful in many ways. For example, it may be utilized to provide an indicated measure of probability that has been accomplished at any point in providing a requested identity determination. And, should there be more than one person as the subject of a second series observation, all those who are not the same person as the known person may be eliminated by the cyber determining machine by utilizing an ever increasing selected minimum indicated measure of probability to quickly eliminate the majority of persons who were observation subjects.

The cyber determining machine disclosed herein may be utilized for determining the exact identity of an unidentified person, even when there is no knowledge of who the unidentified person might be other than the designations that represent second series observations of the unidentified person. For example, the cyber determining machine may determine who an unidentified person is by utilizing selected criteria that call for the most unique combination of recognized characteristics of the unidentified person to be utilized for searching available databases of first series observation records of known persons until either a known person is found that absolutely is the same person as the unidentified person, or there are no further first series observation records of known persons from which to search and compare.

The cyber determining machine disclosed herein also preferably utilizes useful information from any source for providing determinations. Perhaps the most powerful of all information that may be utilized by the cyber determining machine, when making identity determinations, would be information as to exactly who an unidentified person might be. If the information that the cyber determining machine utilizes is accurate, then a search of only one person's first series observation records will provide authentication of the reported identity of the previously unidentified person.

Prior art cybersecurity measures fail to reliably control access to cyber resources because of their inability to accurately determine the exact identity of any person who is utilizing those cyber resources. The systems and methodologies of the present disclosure may provide cyber identity determinations from a full spectrum of cyber identity determinations as to whether a known person and an unidentified person are the same person. At one farthest end of this range is the identity determination that an unidentified person and a known person absolutely are the same person. This identity determination may be utilized to accurately grant only the known person access to his or her own personal and private cyber resources. Since unique biological characteristics of the known person that can never be replicated by others were utilized for providing the identity determination, then all others may be accurately excluded from ever gaining access to the cyber resources of the known person.

One of the greatest concerns of those who are skilled in the art of providing easy to use biological-based identity determinations of a person is that the utilized information comprising the cyber identity of a person may be stolen and then used fraudulently or maliciously. The scalable universal full spectrum cyber determining machine of this disclosure provides cyber identity determinations of a person which preferably utilize unique biological characteristics of the person that can never be replicated by others, and, in many instances, utilize a combination of a number of unique biological characteristics of a person that are observed simultaneously or over one or more periods of time are utilized for providing cyber identity determinations.

Once again, looking to the future of humanity's use of cyber resources, there should come a time when humanity responsibly utilizes cyber resources as a tool to regularly augment each person's own natural cognitive and observational capabilities.

In order for a person to achieve the highest attainable levels of benefits from utilization of cyber resources for augmenting his or her own natural cognitive and observational capabilities, it is desirable to first provide the person with a relationship of access to utilized cyber resources that is almost identical to the relationship of access the person has with his or her own mind and senses.

Therefore, it is desirable that personal and private cyber information and resources be configured to where they can never be accessed by anyone other than the known person. As an example, a person may not want to be hypnotized for the purpose of others using information from the privacy of the person's mind for any reason. The person may also not want anyone to gain access to his or her own personal and private cyber resources and information, including health records, financial information, geographical locating reports, cyber communications of all kinds, cyber interactions of all kinds including for commerce, education, entertainment, self-help, and so on. Similarly, a person may not want anyone to gain access to all or any part of the person's private cyber resources and information post mortem, just as it is with the person's own natural cognitive resources.

Through use of a cyber determining machine and a point of cyber access computer, it will be possible, as it also is with a person's own natural capabilities, to share any selected portion of the person's own personal and private (cyber-based) information and resources with selected others.

One skilled in the art will appreciate that some of the methodologies disclosed herein may be implemented utilizing one or more software programs. Such software programs may take the form of suitable programming instructions disposed in a tangible, non-transient medium which, when implemented by one or more computer processors, perform part or all of the methodologies described herein.

While the disclosed scalable universal full spectrum cyber determining machine has been defined in terms of its preferred and alternative embodiments, those of ordinary skill in the art will understand that numerous other embodiments and applications of the disclosed cyber determining machine will become apparent. Such other embodiments and applications shall be included within the scope and meaning of the disclosure as defined by the appended claims. Moreover, it is to be understood that the above description of the present disclosure is illustrative, and is not intended to be limiting. It will thus be appreciated that various additions, substitutions and modifications may be made to the above described embodiments without departing from the scope of the present disclosure. Accordingly, the scope of the present disclosure should be construed in reference to the appended claims.

What is claimed is:

1. A scalable universal full spectrum cyber determining machine, said scalable universal full spectrum cyber determining machine comprising:
at least one computing device equipped with a storage module and utilizing (a) criteria selected from the group consisting of criteria that may be utilized by said cyber determining machine, (b) selected useful information, (c) selected necessary programming, and (d) any other necessary resource, all of which being structured and utilized for providing at least one cyber determination;
wherein said at least one cyber determination is selected from the group consisting of a full spectrum of cyber determinations;
wherein said at least one cyber determination is utilized for at least one purpose;
wherein said useful information is derived from at least one member selected from the group consisting of (a) at one or more points in time, and (b) over at least one period of time;
wherein said useful information is selected from the group consisting of a full spectrum of useful information that may be utilized by said cyber determining machine;
wherein said full spectrum of useful information that may be utilized by said cyber determining machine includes useful information that was derived from at least one sensor observation;
wherein said at least one sensor observation provides useful information regarding at least one aspect of at least one subject of said at least one sensor observation;
wherein at least one cyber determination regarding said at least one subject of at least one sensor observation is selected from the group consisting of a full spectrum of cyber determinations regarding subjects of sensor observations;
wherein said at least one aspect of at least one subject of at least one sensor observation is selected from the group consisting of a full spectrum of observable aspects of subjects of sensor observations;
wherein said at least one subject of at least one sensor observation is selected from the group consisting of a full spectrum of subjects of sensor observations;
wherein said cyber determining machine utilizes at least one observed characteristic regarding at least one aspect of said at least one subject of at least one sensor observation;
wherein said at least one observed characteristic is selected from the group consisting of a full spectrum of observable characteristics of subjects of sensor observations;
wherein said at least one sensor observation is at least one type of sensor observation selected from the group consisting of (a) visual sensor observations, (b) audible sensor observations, (c) thermal sensor observations, (d) olfactory sensor observations (e) tactile sensor observations, and (f) any other type of sensor observation from a full spectrum of types of sensor observations;
wherein said at least one sensor observation has at least one characteristic selected from the group consisting of a full spectrum of characteristics of sensor observations;
wherein each said scalable cyber determining machine is configurable, in regard to included resources, to fall at one or more points in a range of from a minimum to a maximum, wherein at the minimum said cyber determining machine includes only the resources that are needed for providing for a least complex, in regard to included necessary resources, of all cyber determination needs, and wherein at the maximum said cyber determining machine includes all of the resource that are needed for providing every cyber determination from a full spectrum of cyber determinations;
wherein said scalable cyber determining machine provides at least one determination selected from the group consisting of (a) at least one single cyber determination, (b) at least one intermittently provided cyber determination, and (c) at least one constantly provided cyber determination; and
wherein said scalable cyber determining machine further comprises utilizing at least one part of at least one step selected from the group consisting of
(a) a first series observation step wherein said cyber determining machine utilizes at least one sensor observation, wherein at least one subject of said at least one sensor observation has at least one previously determined aspect, said cyber determining machine recognizing at least one characteristic regarding said previously determined aspect, said at least one recognized characteristic being utilizable by said cyber determining machine in providing said at least one cyber determination, said cyber determining machine assigning designations representing (i) said at least one observation, (ii) said at least one known aspect of said at least one observation subject, and (iii) said at least one observed characteristic, said cyber determining machine including at least one first series observation record which includes said designations, (b) a second series observation step wherein said cyber determining machine utilizes at least one sensor observation, wherein at least one subject of said at least one sensor observation has at least one yet to be determined aspect, said cyber determining machine recognizing at least one characteristic regarding said at least one yet to be determined aspect, said cyber determining machine assigning designations representing (i) said at least one observation, (ii) said at least one yet to be determined aspect of said at least one observation subject, and (iii) said at least one characteristic regarding said at least one yet to be determined aspect, wherein said cyber determining machine includes at least one second series observation record containing said designations, (c) a matching step wherein said cyber determining machine matches at least one designation from at least one second series observation record with at least one designation from at least one first series observation record, (d) a comparing step wherein said cyber determining machine compares designations from at least one second series observation record with designations from at least one comparable first series observation record and provides at least one conclusion from the comparison, (e) a determining step wherein said cyber determining machine utilizes at least one selected from the group consisting of (a) said at least one conclusion from said at least one comparing step, and (b) said useful information, for making said at least one cyber determination, and (f) a reporting step wherein said cyber determining machine provides at least one report regarding at least one aspect of at least one part of at least one cycle of operation of said cyber determining machine.

2. The cyber determining machine of claim 1, wherein said scalable cyber determining machine achieves at least one selected attainable level of accuracy goal for at least one cyber determination, and wherein said at least one attainable level of accuracy goal falls within a range extending from 0% up to, and including, 100% accuracy.

3. The cyber determining machine of claim 1, wherein said cyber determining machine provides for any possible level of observation participation by at least one person who is at least one subject of at least one cyber sensor observation, and wherein said any possible level of observation participation ranges from said at least one person being present but not consciously or otherwise engaged in said at least one cyber sensor observation, to said at least one person being an active and consciously engaged participant in said at least one cyber sensor observation.

4. The cyber determining machine of claim 1, wherein said cyber determining machine utilizes at least one cyber sensor observation selected from the group consisting of (a) at least one cyber sensor observation which is of at least one characteristic of at least one observation subject, and which is observed at one or more points in time, and (b) at least one cyber sensor observation which is of at least one characteristic of at least one observation subject, and which is observed over at least one period of time.

5. The cyber determining machine of claim 4, wherein said at least one cyber sensor observation occurs over said at least one period of time and includes observation of at least one change that occurs to at least one observation subject over said at least one period of time.

6. The cyber determining machine of claim 5, wherein said at least one subject of at least one cyber sensor observation includes at least one person being said at least one observation subject, and wherein said at least one change that occurs to said at least one observation subject is at least one change of at least one observable aspect of at least one part of at least one feature of said at least one person.

7. The cyber determining machine of claim 6, wherein said at least one feature of said at least one person is selected from the group consisting of a head, face, mouth, eyes, eyebrows, nose, arms, hands, fingers, legs, feet, neck, torso, skin, heart, stomach, intestines, liver, kidneys, lungs, breath, vascular system, brain, spinal cord, neural system, skeleton, blood, and any other feature of a person from a full spectrum of features of a person where cyber sensor observable changes occur.

8. The cyber determining machine of claim 1, wherein at least one provided cyber determination includes the determination of any indicated measure that exists of at least one yet to be identified person being the same person as a known person, wherein said at least one determination ranges from determining said yet to be identified person absolutely is not said known person, through determining any intermediate indicated measure of probability that exists of said yet to be identified person being said known person, to determining said yet to be identified person absolutely is said known person.

9. The cyber determining machine of claim 1, wherein said cyber determining machine is configured to perform:
a repeating step in which said cyber determining machine selects at least one part of at least one first series observation of at least one person for repetition by at least one yet to be identified person, wherein said at least one yet to be identified person performs said at least one repetition, wherein said cyber determining machine assigns designations representing (a) said at least one observation, (b) said at least one repetition, and (c) at least one characteristic regarding said at least one yet to be identified person.

10. The cyber determining machine of claim 9, wherein said scalable cyber determining machine includes at least one second series observation record of said at least one repetition, and wherein said at least one second series observation record includes said designations assigned by said cyber determining machine.

11. The cyber determining machine of claim 1, wherein said cyber determining machine is configured to perform the step of:
searching available first series observation records of previously determined aspects of first series observation subjects until either every determination goal has been achieved, or there are no further first series observation records to search.

12. The cyber determining machine of claim 1, wherein said cyber determining machine is configured to perform the step of:
utilizing useful information which is derived from at least one source other than at least one selected from the group of (a) said at least one first series observation record, and (b) said at least one second series observation record.

13. The cyber determining machine of claim 1, wherein said cyber determining machine comprises said at least one computing device utilizing said selected criteria, said selected information, said selected programming, and said any other necessary resource, all of which being utilized for the purpose of accurately granting or denying access to at least one part of at least one resource selected from the group consisting of (a) said cyber determining machine (b) at least one cyber resource that is being utilized by said cyber determining machine, and (c) at least one resource that is utilizing said cyber determining machine.

14. The cyber determining machine of claim 1, wherein said cyber determining machine is configured to perform the step of:
said cyber determining machine manipulating the operations of at least one selected from the group consisting of (a) said cyber determining machine utilized resources, and (b) said cyber determining machine itself; wherein said manipulating provides said cyber determining machine with selection of possible utilizations, wherein said manipulating is utilized for at least one purpose.

15. The cyber determining machine of claim 14, wherein said at least one purpose for utilizing said manipulating includes aiding in achieving at least one attainable cyber determination goal.

16. The cyber determining machine of claim 1, wherein said cyber determining machine further includes cyber determining machine history, wherein said cyber determining machine history includes at least one cyber determining machine history record.

17. The cyber determining machine of claim 1, wherein at least one observation record that was derived from at least one source other than said first series observation step is included as at least one first series observation record.

18. The cyber determining machine of claim 1, wherein said at least one observation record that was derived from at least one source other than said second series observation step is included as at least one second series observation record.

19. The cyber determining machine of claim 1, wherein all or any part of the operations of said cyber determining machine are performed in any order.

20. The cyber determining machine of claim 1, wherein said cyber determining machine includes at least one standard cyber determining machine designation representing at least one aspect of at least one operation of said cyber determining machine.

21. The cyber determining machine of claim 1, wherein said machine includes at least one sensor.

22. The cyber determining machine of claim 1, wherein said machine includes at least one display screen.

23. A method for operating a scalable, full spectrum cyber determining machine, comprising:
deriving information, from at least one point in time or over at least one period of time, from a spectrum of information that includes at least one observed characteristic of at least one subject of at least one sensor observation, thereby obtaining derived information, wherein said at least one sensor observation is a type of sensor observation selected from the group consisting of (a) visual sensor observations, (b) audible sensor observations, (c) thermal sensor observations, (d) olfactory sensor observations, (e) tactile sensor observations, and (e) any other type of sensor observation; wherein said cyber determining machine comprises at least one computing device, said cyber determining machine providing at least one cyber determination through a utilization of (a) criteria that may be utilized by said cyber determining machine, (b) said derived information, and (c) any necessary programming and resources, wherein said cyber determining machine provides at least one cyber determination selected from the group consisting of (i) at least one single cyber determination, (ii) at least one intermittently provided cyber determination, and (iii) at least one constantly provided cyber determination; and
utilizing said at least one cyber determination for at least one purpose;
wherein said method further comprises utilizing at least one part of at least one step selected from the group consisting of
(a) a first series observation step utilizing at least one sensor observation, wherein at least one subject of said at least one sensor observation has at least one previously determined aspect, said cyber determining machine recognizing at least one characteristic regarding said previously determined aspect, said at least one recognized characteristic being utilizable by said cyber determining machine in providing said at least one cyber determination, said cyber determining machine assigning designations representing (i) said at least one observation, (ii) said at least one known aspect of said at least one observation subject, and (iii) said at least one observed characteristic, said cyber determining machine including at least one first series observation record which includes said designations,
(b) a second series observation step utilizing at least one sensor observation, wherein at least one subject of said at least one sensor observation has at least one yet to be determined aspect, said scalable cyber determining machine recognizing at least one characteristic regarding said at least one yet to be determined aspect, said cyber determining machine assigning designations representing (i) said at least one observation, (ii) said at least one yet to be determined aspect of said at least one observation subject, and (iii) said at least one characteristic regarding said at least one yet to be determined aspect, wherein said cyber determining machine includes at least one second series observation record containing said designations,
(c) a matching step matching at least one designation from at least one second series observation record with at least one designation from at least one first series observation record,
(d) a comparing step comparing designations from at least one second series observation record with designations from at least one comparable first series observation record, and providing at least one conclusion from the comparison,
(e) a determining step wherein said cyber determining machine utilizes at least one selected from the group consisting of (a) said at least one conclusion from said at least one comparing step, and (b) said useful information for making said at least one cyber determination, and
(f) a reporting step providing at least one report regarding at least one aspect of at least one part of at least one cycle of utilization of said cyber determining machine.

* * * * *

UNITED STATES PATENT AND TRADEMARK OFFICE
CERTIFICATE OF CORRECTION

| | | |
|---|---|---|
| PATENT NO. | : 9,635,025 B2 | Page 1 of 1 |
| APPLICATION NO. | : 15/071075 | |
| DATED | : April 25, 2017 | |
| INVENTOR(S) | : Jeffry David Aronson | |

It is certified that error appears in the above-identified patent and that said Letters Patent is hereby corrected as shown below:

On the Title Page

Title (54)
Please replace the title with the following new title:
Scalable Universal Full Spectrum Cyber Determining Machine Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*